Figure 1:
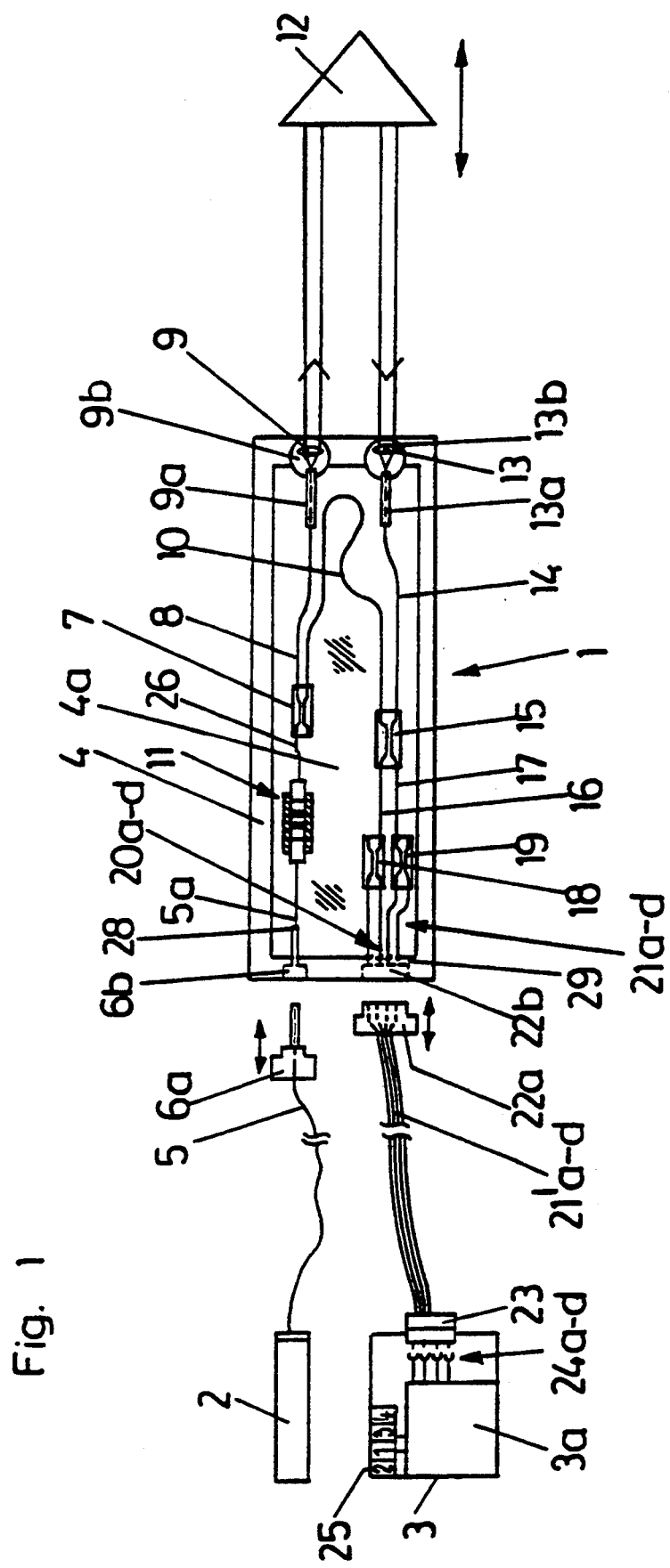

United States Patent [19]
Tabarelli

[11] Patent Number: 5,359,415
[45] Date of Patent: Oct. 25, 1994

[54] INTERFEROMETER FOR DETERMINING THE POSITION OF DISPLACEMENT TRAVEL OF A MOVABLE MEASURING MIRROR OR THE LIKE

[76] Inventor: Werner Tabarelli, Landstrasse 152, FL9494 Schaan/Liechtenstein, Austria

[21] Appl. No.: 934,447
[22] PCT Filed: Feb. 28, 1991
[86] PCT No.: PCT/AT91/00034
 § 371 Date: Sep. 1, 1992
 § 102(e) Date: Sep. 1, 1992
[87] PCT Pub. No.: WO91/13317
 PCT Pub. Date: Sep. 5, 1991

[30] Foreign Application Priority Data

Mar. 2, 1990 [AT] Austria ............................. 497/90

[51] Int. Cl.⁵ .................................. G01B 11/02
[52] U.S. Cl. ........................ 356/358; 356/359; 356/356; 356/352
[58] Field of Search ............ 356/358, 356, 350, 359, 356/352

[56] References Cited

U.S. PATENT DOCUMENTS 4,420,260 12/1983 Martinelli .................. 356/351
4,909,629 4/1990 Yokokura et al. ............ 356/358

FOREIGN PATENT DOCUMENTS 2630537 10/1989 France.

*Primary Examiner*—Samuel A. Turner
*Assistant Examiner*—LaCharles Keesee
*Attorney, Agent, or Firm*—Lorusso & Loud

[57] ABSTRACT

As interferometer, especially for length measurement, with a laser light source (2) and a beam divider (7) to divide the laser light into a measuring and a reference beam which, after passing along geometrically separate paths, interfere in at least one recombination device (15), and with a photoelectric detector device (3) to evaluate the interference signals from the recombination device(s) (15). A flexible optical fibre (5) to guide the laser light is arranged between the laser light source (2) and the actual interferometer with the beam divider (7). In order to ensure the optical operation of the interferometer independently of external effects on the laser light-guide optical fibre, the interferometer has a polarising device (11) to establish a defined, preferably linear polarisation of the laser light at the input of the beam divider (7) which is advantageously arranged behind the flexible laser light-guide (5) and in front of the beam divider (7).

34 Claims, 5 Drawing Sheets

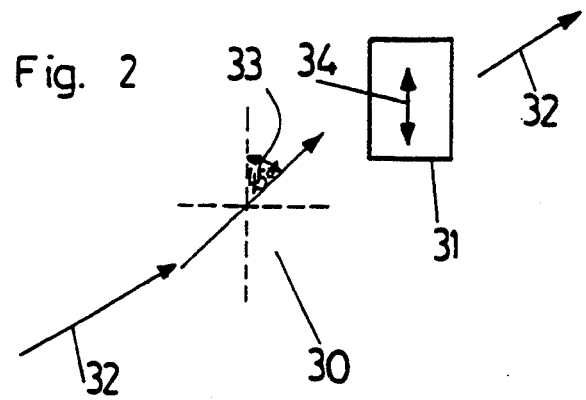
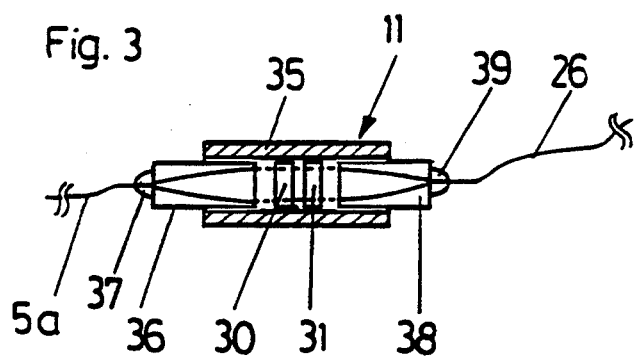
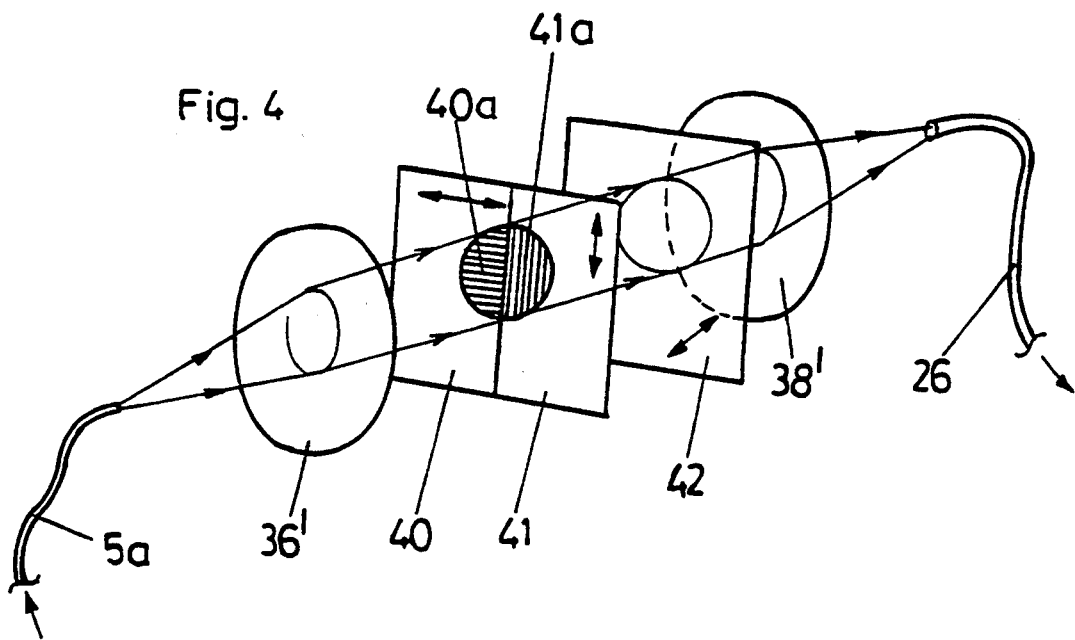

INTERFEROMETER FOR DETERMINING THE POSITION OF DISPLACEMENT TRAVEL OF A MOVABLE MEASURING MIRROR OR THE LIKE

The invention relates to an interferometer for determining the position or displacement travel of a movable measuring mirror or the like comprising an interferometer head, to the housing or carrier of which are rigidly connected a beam divider for dividing the laser light into a measuring beam and a reference beam, and a recombination device, wherein the measuring beam which is passed by way of the movable measuring mirror or the like and the reference beam which is passed by way of a fixed reference section interfere in the recombination device forming at least one optical interference signal, a laser light source arranged outside the interferometer head, wherein at least one flexible optical fiber for the laser light feed is arranged between the laser light source and the beam divider of the interferometer head, and a photoelectric detector device for evaluation of the interference signal or signals coming from the recombination device.

Interferometers for length measurement purposes are already known. Typically, in such interferometers, a measuring beam is passed by way of a movable measuring mirror whose displacement travel or position is to be detected. The reference beam passes through a fixed reference section. The measuring beam returning from the measuring mirror and the reference beam coming from the reference section interfere in a recombination device which can be formed for example by a beam divider. With a known laser light wavelength, the displacement travel or measuring mirror data which is correlated therewith can be ascertained from the interference signal.

In order to achieve thermal decoupling between the laser light source and the central optical components of the interferometer (in particular the beam divider, the reference section and the recombination device), it has already been suggested that those central interferometer components should be combined together in an interferometer head and the laser light source should be arranged outside the interferometer head, wherein one or more successively connected optical fibers feed laser light from the laser light source to the interferometer head. However the use of flexible optical fibres for the laser light feed is not without its difficulties. On the contrary, it has been found that the interference signal or signals depends or depend not only on the position of the measuring mirror or the like but also, and this is undesirable, on the position and the loadings of the laser light-feeding optical fiber or fibers.

Therefore the object of the present invention is to provide an interferometer of the kind set forth in the opening part of this specification, in which at least one flexible optical fiber is used for the laser light feed and wherein the position or loadings of the optical fibers do not interfere with the measurement result, thus permitting reliable and interference-free operation.

In accordance with a first variant of the invention, that is achieved in that arranged downstream of the flexible optical fiber or fibers for the laser light feed and upstream of the beam divider is a polarisation means which is connected to the interferometer housing or carrier for establishing a defined, preferably linear polarisation of the laser light at the entrance of the beam divider.

The reference to "defined" polarisation in accordance with the invention means a given polarisation condition (linear, elliptical or left-hand or right-hand circular) of the laser light and, in respect of the linear and elliptical cases, a given spatial orientation of the polarised laser light with respect to the beam divider of the actual interferometer. In the case of linear polarisation, the spatial orientation is determined by the spatial position of the direction of oscillation of the light vector, while in the case of elliptical polarisation it is given by the spatial position of the long and short semiaxes of the ellipse. For reliable and interference-free operation of an interferometer, maintenance of a defined condition of polarisation of the laser light at the entrance of the interferometer is of decisive significance. Components whose optical properties depend on the polarisation of the laser light are frequently used in interferometers.

For example, the variation in polarisation by a measuring mirror which is in the form of a retroreflector depends on the polarisation of the laser light at the entrance of the interferometer or the beam divider arranged there. In addition, in dependence on recombination of the interfering light beams (measuring beam and reference beam), interference makes itself noticeable in terms of intensity only to the extent to which the reference beam and the measuring beam involve the same polarisation. What is particularly critical is the polarisation condition of the laser light at the entrance of the interferometer if the interference signal or signals have been tested downstream of the recombination device for given polarisation effects in order for example to deduce therefrom a forward/reverse detection in respect of the movement of the measuring mirror. That polarisation sensitivity in regard to the light at the entrance of the beam splitter for dividing the laser light into a reference beam and a measuring beam gives rise to problems if conventional flexible optical fibers such as for example optical glass fibers are used for the feed of laser light to the actual interferometer (interferometer head), because the polarisation condition at the fiber end depends on the spatial position as well as twisting, mechanical pressure and stretch loadings on the optical fibers.

A possible solution to that problem would lie in the use of special polarisation-maintaining optical fibers for the feed of laser light from the laser light source to the actual interferometer. When using polarisation-maintaining fibers of that kind, the polarisation condition must be checked at the coupling-in end, that is to say at the end of the optical fiber which is towards the light source, as otherwise a large part of the light efficiency can be lost. In practice, a continuous optical fiber will also not be used but rather, because of the greater ease of handling, the system will use a plurality of successively connected optical fiber portions which are connected together by way of releasable fiber connectors. When using polarisation-maintaining fibers, those fiber (plug) connections must also be designed to maintain the polarisation effect. In addition, when using polarisation-maintaining optical fibers there is the risk—even if it is not excessively severe—that there may be cross-talk from one polarisation mode to the other due to severe curvatures, and that results in a change in polarisation. All in all, it can be found that the required high-precision establishment of the polarisation effect at the entrance of the interferometer head is not possible, or is possible only at unacceptably high cost, with polarisation-maintaining optical fibers alone.

Now, the idea according to the invention lies in not being concerned, or not being concerned down to the last detail, about the way in which and the extent to which the optical fibres for the laser light feed change the polarisation condition or direction of the light, but providing outside the laser light feed optical fiber a polarisation means which provides for defined polarisation of the laser light at the entrance of the beam divider. In principle the laser light at the entrance of the beam divider may comprise defined circular or elliptical polarisation. It will be more advantageous however if the polarisation of the laser light at the entrance of the beam divider is linear, in which respect "defined" polarisation then also means that the spatial position of the direction of oscillation of the light vector is fixed with respect to the beam divider at the input of the actual interferometer.

In accordance with the first variant of the invention that polarisation means is arranged downstream of the flexible optical fiber or fibers for the laser light feed and upstream of the beam divider for division into measuring and reference beams. The polarisation means is therefore disposed between the end, which is towards the beam divider, of the optical fiber or fibers, and the beam divider, preferably in the vicinity of the latter. Another variant of the invention, which is described hereinafter, essentially provides arranging the polarisation means upstream of the end, which is towards the light source, of the flexible optical fiber or fibers for the laser light feed, detecting the polarisation condition in the vicinity of the entrance of the beam divider and, by way of a regulating means, so regulating the polarisation of the laser light which is produced by the polarisation means that the polarisation of the laser light at the entrance of the beam divider is fixed.

Attention will firstly be directed to that situation in which the polarisation means is disposed between the end of the optical fiber or fibers, which is towards the beam divider, and the beam divider itself. A particularly advantageous construction in which the polarisation means as a whole is held in a defined position relative to the beam divider provides that the polarisation means, the beam divider or dividers, the recombination device or devices and possibly further optical components of the interferometer are rigidly connected to an interferometer head housing or carrier or are fixedly disposed therein, wherein the interferometer head is supplied with laser light by way of the flexible optical fiber or fibers from the laser light source which is disposed outside the interferometer head. The interferometer head housing provides good protection for the optical components disposed therein, in relation to environmental factors and mechanical effects. In the interferometer head housing it is in particular also possible for optical fibers which connect the individual optical components to be rigidly connected, for example by adhesive, to the interferometer head housing or a carrier, so that the optical fibers cannot suffer from any shifts in position in the interferometer head, even due to violent mechanical effects. It will be appreciated that such a shift in position could result in an undesired change in the polarisation condition or the interference signals and could thus result in falsification of the measurement results. When the interferometer head is of a compact nature of that kind, from which the light is passed onto the measuring section for example by way of a coupling-out lens and is coupled back into the head again from the measuring section after reflection at a measuring mirror by way of a coupling-in lens, it is advantageous if the photoelectric evaluation device is also disposed in per se known manner outside the interferometer head and receives the optical interference signals from the interferometer head by way of flexible output optical fibers. If the optical interference signal coming from the recombination device is divided into two phase-shifted polarisation components which then permit improved evaluation, for example forward-reverse detection of the movable measuring mirror, it is advantageous if that is effected by polarisation filters whose axes are perpendicular to each other and at 45 degrees to that linear polarisation direction which is defined by the polarisation means at the entrance of the beam divider. If those polarisation filters are disposed in the interferometer head, the polarisation properties of the flexible output optical fibers which go from the interferometer head to the photoelectric evaluation device advantageously play no part.

As already mentioned, the most essential purpose of the polarisation means at the entrance of the beam divider of the interferometer is to establish a defined polarisation condition, in particular linear polarisation with a predetermined direction of oscillation. So that that polarisation means can be used in a practical context without involving serious disadvantages, it is desirable in accordance with a preferred feature if the polarisation means always transmits light irrespective of the preferably linear polarisation condition of the laser light at its entrance and the light at the output of the polarisation means has a defined, preferably linear polarisation. Evidently that feature cannot be embodied by means of a simple polariser on its own because no light is transmitted in the event of polarisation of the incoming light, perpendicularly to the orientation of the polariser. However that feature can be embodied using relatively simple means, by virtue of a more skillful configuration of the polarisation means. Embodiments in that respect will be described in greater detail hereinafter. What is particularly desirable for operation of the interferometer, although not absolutely necessary, is a configuration of the polarisation means which is such that the level of intensity of the laser light issuing in a preferably linearly polarised condition from the polarisation means is independent of the polarisation of the laser light at the entrance of the polarisation means, at least when the laser light at the entrance of the polarisation means is linearly polarised.

A simple polarisation means in which the issuing laser light is always of the same linear polarisation direction and the same level of intensity, irrespective of linear polarisation of the incoming laser light, essentially comprises a quarter-wave plate and a polariser which is disposed downstream thereof, the axes thereof being at 45 degrees to each other. The polariser defines the linear polarisation direction at the output and the quarter-wave plate provides that the level of light intensity at the output of the polarisation means is independent of the linear polarisation at the entrance of the polarisation means.

A further preferred embodiment of the polarisation means according to the invention, which can be disposed between the end, which is towards the beam divider, of the laser light feed optical fiber, and the beam divider, provides that the polarisation means has a means for expanding or dividing the laser light beam coming from the flexible optical fiber or a fiber connected thereto, that the polarisation means has two polarisers with mutually perpendicularly disposed polarisation directions, through each of which passes a beam portion, that disposed downstream of said polarisers is at least one polariser which is oriented at 45 degrees relative to the two said polarisers and through which the two beam portions pass and that finally there is provided a means for bringing the two beam portions together after passing through said polarisers.

In order to ensure, with that embodiment of the polarisation means according to the invention, that the situation does not involve complete destructive interference when the two beam portions are brought together, when dealing with given input polarisation conditions of the laser light, it is desirable to provide that the two beam portions are of different intensities upon recombination thereof. That can be achieved by partial attentuation of one of the two beam portions. It is more desirable however if for that purpose it is provided that the expanded laser light beam is received at the two mutually perpendicularly disposed polarisers on areas of different sizes.

A further preferred embodiment of the polarisation means according to the invention provides that the polarisation means has a dividing means for dividing the incoming laser light into two beam portions which are linearly polarised perpendicularly to each other, that in addition there is provided a polarisation turning means for turning the polarisation direction of at least one of the two beam portions, and that provided at the output end is a recombination means to superpose the beam portions which are turned in mutually parallel relationship in terms of their linear polarisation direction by the polarisation turning means. In order to avoid completely destructive interference with certain input polarisation effects upon recombination of the two beam portions which are turned in parallel relationship in terms of their polarisation direction, this embodiment of the polarisation means may include a means for adjusting the phase difference between the two beam portions upstream of or upon recombination. That adjusting means may be for example an electro-optical element or a piezoelectric element which alters the geometrical travel length difference for the two beam portions. Those elements for varying the difference between the two beam portions at or before recombination thereof can be regulated in a simple and precise manner. In accordance with a preferred embodiment those elements or the phase difference in respect of the two beam portions are regulated directly or indirectly in dependence on the intensity of the linearly polarised laser light at the output of the polarisation means. "Direct" regulation is possible for example by detecting the output intensity of the laser light leaving the polarisation means and so adjusting the difference between the two beam portions before or upon recombination thereof that the output intensity is at a maximum. "Indirect" regulation of the level of intensity of the issuing laser light is possible for example when the two beam portions are recombined at a beam divider. Such a beam divider has two complementary outputs. One of those outputs will form the output of the polarisation means while the other output is a secondary output. If the level of intensity of the light at that secondary output is detected as an actual regulating value or parameter, it is possible, by minimising the level of intensity at the secondary output, thereby indirectly to maxinmise the level of intensity at the complementary main output which represents the output of the polarisation means.

Further advantages and features of the invention are described in greater detail in the following specific description.

Figure 5:
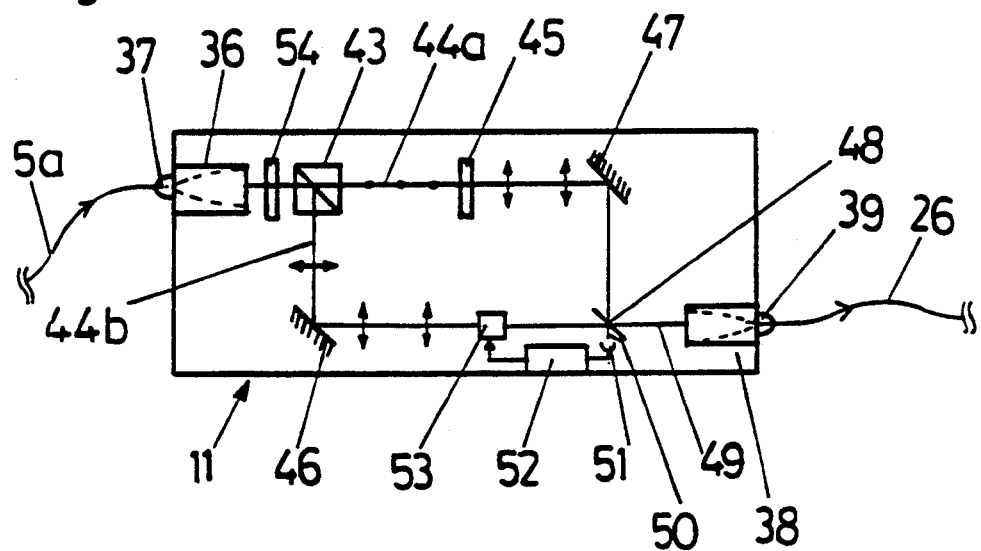
Figure 6:
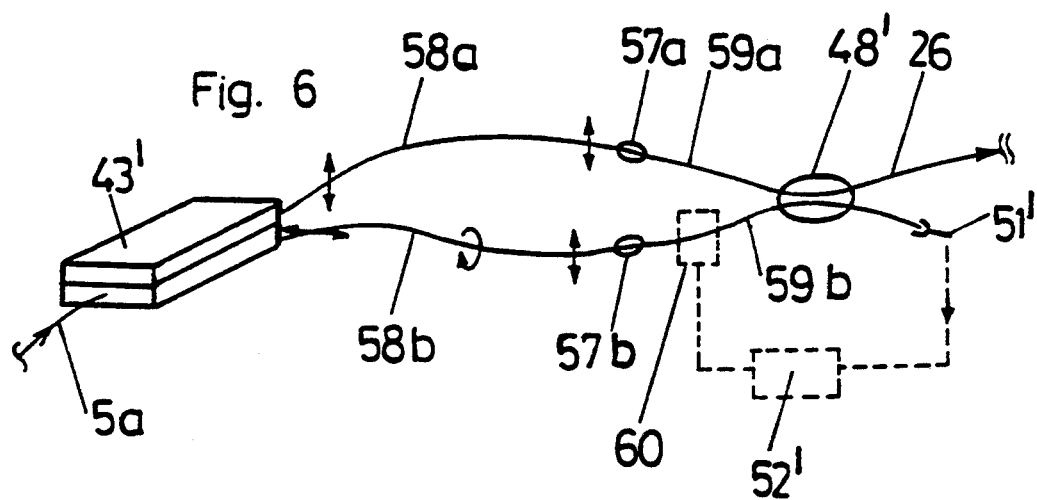
Figure 7:
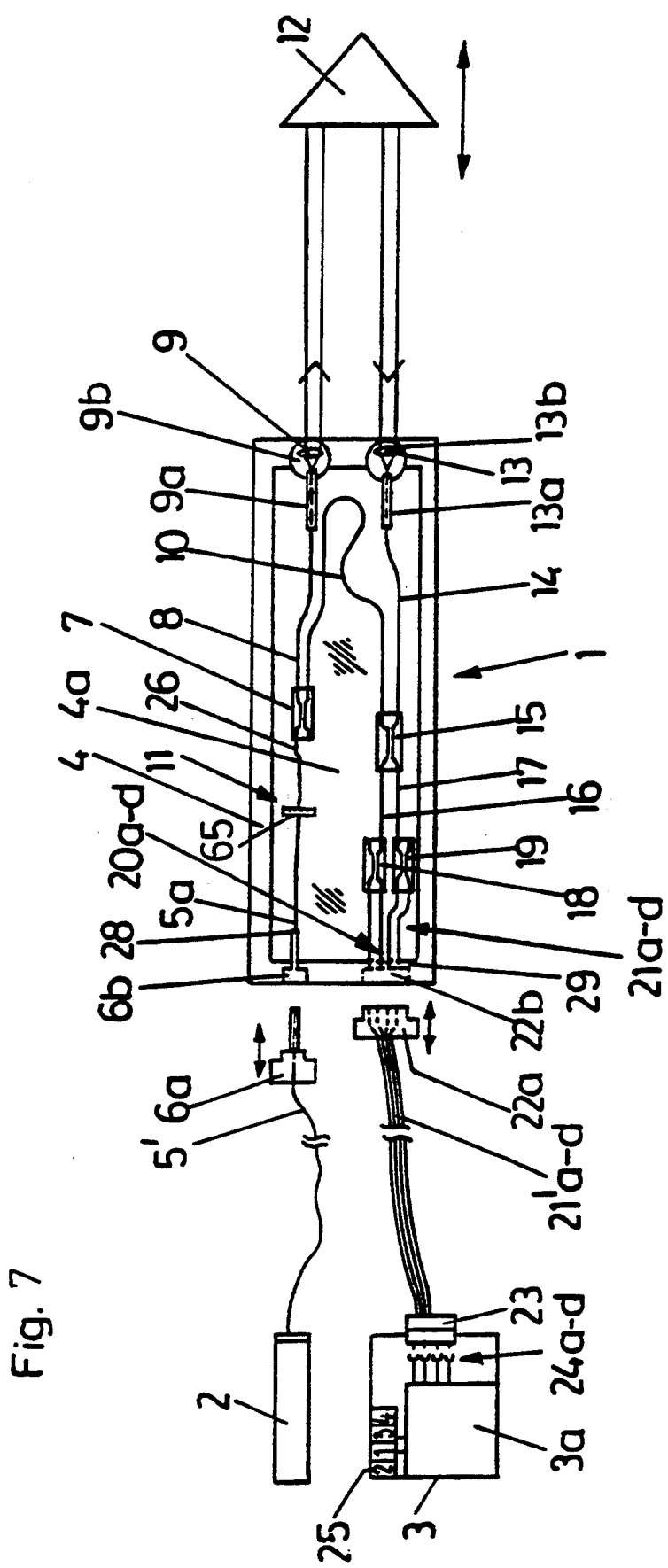
Figure 8:
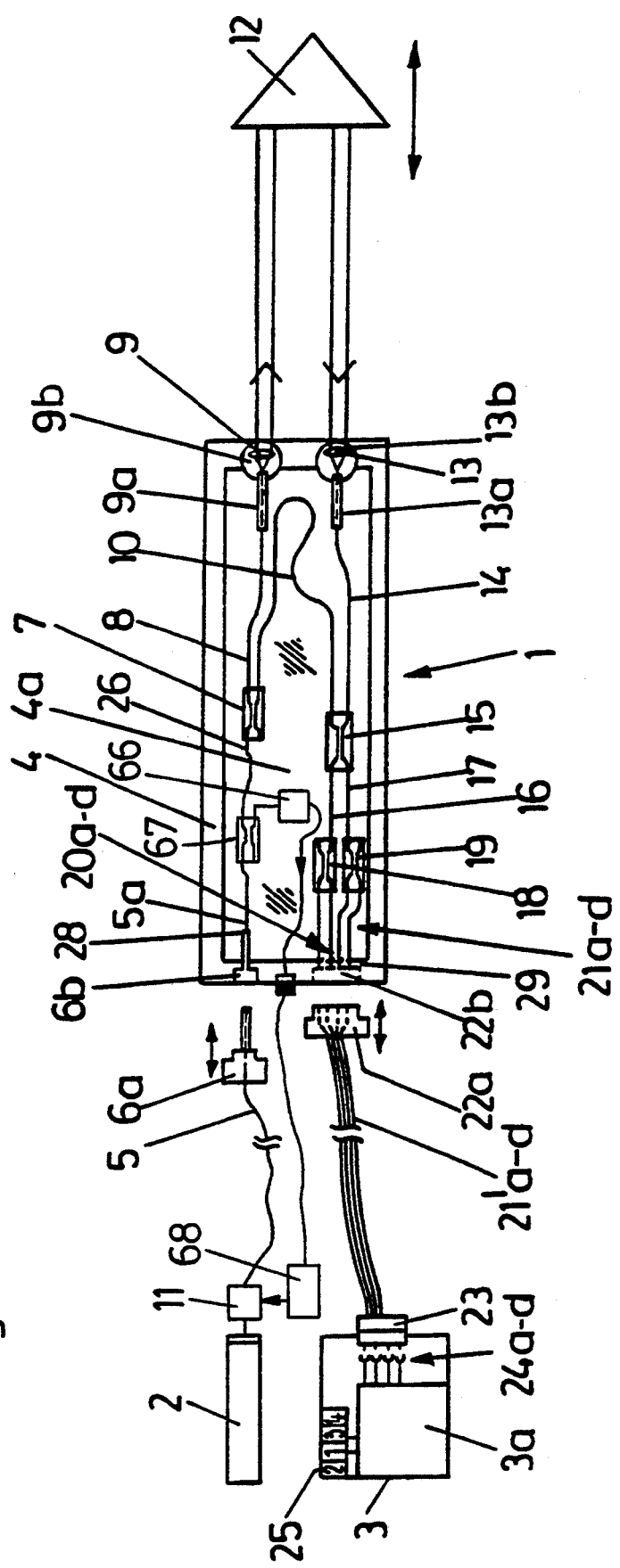

In the drawings FIG. 1 is a diagrammatic plan view of an embodiment of the interferometer according to the invention, FIG. 2 is a diagrammatic perspective view of the essential optical components of an embodiment of the polarisation means according to the invention, FIG. 3 is a view in longitudinal section through an embodiment of the polarisation means according to the invention, FIG. 4 is a perspective view of a further embodiment of the polarisation means according to the invention, FIG. 5 is a diagrammatic plan view of a further embodiment of the polarisation means according to the invention, FIG. 6 shows an embodiment of an optical-fiber design configuration, FIG. 7 is a diagrammatic plan view of a further embodiment and FIG. 8 is a diagrammatic view of a further variant of the interferometer according to the invention.

The interferometer shown in FIG. 1 comprises an interferometer head 1, a laser light source 2 (for example a helium neon laser or a laser diode) for supplying the interferometer head 1 with laser light and a photoelectric detector and evaluation device 3 for evaluation of the optical interference signals coming from the interferometer head. The interferometer head 1 is enclosed by a closed housing 4 of metal and in its interior contains a plurality of optical components which are connected by monomode glass fibers and which are described in greater detail hereinafter. The laser light from the laser light source 2, which is supplied to the interferometer head 1 by way of the flexible optical fiber 5, goes by way of a polarisation means which is described in detail hereinafter to a bean divider 7 which provides for division into a measuring beam and a reference bean. A two-part fiber connector 6a, 6b is provided for releasable connection of the optical fiber 5.

The measuring beam is passed by way of the monomode glass fiber 8 and the coupling-out lens 9 (gradient index lens) onto the measuring section which is disposed outside the interferometer head and which extends in the ambient medium. The reference beam extends in the reference fiber 10 in the interferometer head 1. The retroreflector 12 is fixed to a component (not shown) which is displaceable in the direction indicated by the double-headed arrow. The retroreflector 12 reflects the measuring beam back to the interferometer head 1, with beam displacement. The measuring bean passes into the glass fiber 14 by way of a separate coupling-in lens 13. Alignment and fixing of the lenses 9 and 13 are effected by way of an adjustment of the lens holders 9b and 13b respectively, as well as the fiber holders 9a and 13a respectively which are connected thereto. In the recombination device 15 which is in the form of a fiber coupler, the measuring beam returning from the measuring section and the reference beam which is guided in the reference fiber 10 are caused to interfere. Two further beam dividers 18 and 19 are connected to the two complementary outputs 16 and 17 of the recombination device 15. The phase-shifted optical interference signals pass by way of polarisation filters 20a–d into the flexible optical fibers 21'a–d which go to the detector device 3 and which are releasably connected to the housing 4 by way of a two-part multiple fiber connector 22a, 22b. Besides the displacement travel of the retroreflector 12, the direction of displacement and the modulation effect of the interference signal can be ascertained in known manner from the four interference signals which are phase-shifted relative to each other each through 90°. For that purpose the polarisation filters 20a–d are oriented at 45° to the linear polarisation direction established by the polarisation means 11. The two polarisation components pass through the same measuring section. A λ/4-plate (quarter-wave plate, not shown) for example can be disposed in the reference path 10 in order to cause phase displacement of one polarisation direction through 90° relative to each other. It is however possible for that phase displacement to be caused by other components, for example in the retroreflector 12 itself.

Besides a fiber connector 23, the detector device 3 has four photodetectors 24a–d. Those four photodetectors 24a–d generate from the optical interference signals electrical signals which are evaluated by an electronic unit 3a. The result (the position of the retroreflector 12) is displayed by way of a display device 25.

In the embodiment shown in FIG. 1, the housing 4, with the flat bottom 4a, forms a rigid carrier body to which the beam divider 7 and the recombination device 15 are rigidly connected, for example by adhesive. The optical fiber portions 8 and 14 which carry the measuring beam and the reference fiber 10 which carries the reference beam are also rigidly connected, for example by adhesive, to the carrier body or housing bottom 4a. Thus there cannot be any change in position of the initially flexible optical fibre portions 8, 10 and 14 in the critical region where the reference and measuring beams extend in spatially separate relationship within the interferometer head 1. More specifically such changes in position could change the optical properties (for example polarisation) of the optical fibre portions and thus undesirably alter the optical interference signals produced by the recombination device 15 and thus falsify the measurement result.

All in all the beam divider 7, the recombination device 15, the two lenses 9 and 13, the optical fiber portions 8 and 14 carrying the measuring beam and the reference fiber 10 carrying the reference beam are rigidly connected to the interferometer head housing 4 (carrier body), thus providing a component which is insensitive to the effects of pressure, shock and impact. That insensitivity to mechanical influences is still further enhanced by the fact that the other components and optical fibers in the interferometer head are also rigidly connected thereto, for example by adhesive. In particular, an optical fiber 5a and 26 respectively rigidly connected to the interferometer head housing 4 are provided for guiding the laser light from the entrance 28 of the interferometer head 1 to the polarisation means 11 and from there to the beam divider 7 respectively, and the arrangement also has optical fibers 6, 17 and 21a–d which are also rigidly connected to the housing 4 for guiding the optical interference signals downstream of the recombination device 15 to the output 29. In addition, the essentially closed housing 4 which can be sealingly closed for example by a releasably fixed cover affords protection from mechanical interference effects. In addition such a housing enhances the lack of sensitivity to fluctuations in environmental conditions.

The optical fibers in the interferometer head 1 are disposed substantially in one plane (lying on the flat bottom 4a of the housing 4), thus avoiding any uncontrolled changes in the polarisation condition of the laser light carried in the optical fibres.

While insensitivity in relation to mechanical effects can be relatively easily achieved within the interferometer head 1 by suitably fixing the optical components and optical fibers, that is not the case with the flexible optical fiber which serves for the feed of laser light from the laser light source 2 to the interferometer head 1. On the contrary, due to changes in position and twisting and due to mechanical compression and stretch loadings on the flexible optical fiber (in the present embodiment, because of the advantageous light guide properties, preferably a monomode glass fiber), there are changes in the polarisation condition at the output of the flexible optical fibre 5, which is towards the interferometer head. Those changes in the polarisation condition of the laser light at the entrance of the interferometer or the beam divider 7 result in unacceptable falsifications of the measurement result. In order to avoid that, in accordance with the invention there is provided a polarisation means 11 which in the present embodiment is disposed between the flexible optical fiber 5 or the fiber 5a connected thereto, and the beam divider 7. This polarisation means which is described in greater detail hereinafter provides that, irrespective of the polarisation condition of the light at its input, linear polarisation of the laser light, which is defined in terms of its direction of oscillation, occurs at the output of the polarisation means or at the entrance of the beam divider 7 of the interferometer. The polarisation means 11 which is disposed in and protected in the interferometer head housing 4 corresponds in terms of its essential polarisation-optical components to FIG. 2 and in terms of its structure to FIG. 3.

The essential polarisation-optical components of the polarisation means in FIG. 1 are shown in FIG. 2. They are a quarter-wave plate 30 and a polariser 31 through which the laser light passes in the direction indicated by reference numeral 32. The optical axis 33 of the birefringent quarter-wave plate is at 45° to the orientation of the polariser 31, which is indicated at 34. The polariser provides for defined linear polarisation at the output of the polarisation means while the quarter-wave plate 30 provides that the light efficiency or power at the output is independent of the polarisation at the input of the polarisation means as long as the laser light passing into the polarisation means is only linearly polarised in some direction. However, in the case of non-linear polarisation conditions at the input of the polarisation means diagrammatically shown in FIG. 2, the output polarisation is at any event linear and is in the direction 34 established by the polariser 31. It is only in the case of a given circular polarisation at the input of the simple polarisation means shown in FIG. 2, that the level of intensity at the output could go to zero. In order to avoid that in this situation which certainly occurs rarely in practice, it would be possible for example for the quarter-wave plate 30 to be turned relative to the polariser 31, in which case the fixed linear output polarisation direction is maintained.

The quarter-wave plate 30 diagrammatically shown in FIG. 3 and the polariser 31 are arranged in a mechanical holder 35, as shown in FIG. 3. Disposed at the entrance of the polarisation means 11 shown in FIG. 3 is a collimation lens 36 (gradient index lens) which collimates the light beam issuing from the optical fiber 5*a* (expands it and passes it as a parallel beam through the optical components 30 and 31). The optical fiber 5*a* is stuck to the gradient index lens 36 by means of an adhesive 37. In order for the laser light which issues from the polarisation means in a defined linear polarisation condition to be fed to the beam divider 7, while maintaining the linear polarisation condition (see FIG. 1), there is provided an optical fiber 26 which is rigidly fixed in terms of its position and which is laid in one plane. In place of that optical fiber, it would also be possible to use a polarisation-maintaining fiber. At any event it is desirable if the polarisation means 11 is arranged in the vicinity of the beam divider 7 so that the defined linear .polarisation established by the polarisation means also actually occurs at the entrance to the beam divider 7. For the purposes of coupling the laser light into the optical fiber 26, the arrangement has a coupling-in lens 38 which is in the form of a gradient index lens and to which the optical fiber 26 is glued by means of an adhesive 39.

The gradient index lenses 36 and 38 have cylindrical external dimensions which easily fit into the holder 35 of a tubular configuration, and can be glued fast for example therein. This simple tubular holder 35 guarantees optimum and permanent alignment of the optical components of the polarisation means 11. Overall therefore the polarisation means 11—as considered in the direction of the passage of light therethrough—has a collimation lens 36 at its entry end, a quarter-wave plate 30, a polariser 31 and a coupling-in lens 38 at the output side for coupling light into an optical fiber 26 which goes to the beam divider 7. In order to avoid back reflections from the end face into the laser light source, the optical fiber 5*a* may also be glued to the lens 36 in slightly eccentric relationship.

In the embodiment shown in FIG. 3 the quarter-wave plate 30 and the polariser 31 are components of a discrete configuration. The combination of a "quarter-wave plate" which is oriented at 45° to a polariser can also be obtained as a foil and can certainly be used here.

FIG. 4 is a diagrammatic view of a further embodiment, a holder for the optical components, which is certainly advantageous in a practical context, not being shown for the sake of simplicity. The embodiment illustrated in FIG. 4 has a device in the form of a convergent lens 36′ for expansion of the laser light beam coming from the optical fiber 5*a*. The convergent lens 36′ is followed by two closely juxtaposed polarisers 40 and 41, the polarisation directions of which are perpendicular to each other. The light beam encounters and passes through the left-hand polariser 40 in the area 40*a* and the right-hand polariser 41 in the area 41*a*. Disposed behind the two polarisers 40 and 41 is a polariser 42 which is oriented at 45° relative to those two polarisers 40 and 41 and which is followed by a convergent lens 38′ which jointly couples into the optical fiber 26 going to the beam divider 7, the two beam portions (left-hand half of the beam which has passed through the polariser 40 and the right-hand half of the beam which has passed through the polariser 41). In order to prevent complete destructive interference in the situation involving certain input polarisation effects at the polarisation means, when the two beam portions are brought together (common coupling into the optical fiber 26), it can be provided that the expanded laser light beam involves the two mutually normal polarisers at areas 40*a* and 41*a* of different sizes, unlike the situation shown in FIG. 3.

It is however also possible partially to attenuate one of the two beam portions or to provide in the beam path an electro-optical plate which is oriented parallel to the polariser 40 or the polariser 41 and which is regulated for example in dependence on the output intensity from the polarisation means.

FIG. 5 is a diagrammatic plan view of a further embodiment of a polarisation means according to the invention. The light beam which is expanded by the collimation lens 36 goes to a polarisation beam divider 43 which divides the light into a beam portion 44*a*, which is linearly polarised perpendicularly to the plane of the drawing and a beam portion 44*b* which is linearly polarised in the plane of the drawing. A half-wave plate 45 operates as a polarisation turning means which turns the polarisation direction of the beam portion 44*a*, through 90° so that the latter is now polarised parallel to the beam portion 44*b*. The two beam portions which are now polarised in the same direction pass by way of direction-changing mirrors 46 and 47 onto the recombination device 48 which is in the form of a beam divider and at which the two beam portions are recombined. A power loss is avoided when the two beam portions constructively interfere in the main output 49 and destructively interfere in the secondary output 50. That can be achieved by means of a regulation system which regulates the phase difference or the optical wavelength difference of the two beam portions. In the case of the embodiment shown in FIG. 5, regulation is effected indirectly in dependence on the level of intensity of the linearly polarised laser light at the main output. The intensity of the secondary output 50 is detected by way of a photodetector 51 and the measurement signal is passed to a regulating device 52. The regulating device controls an electro-optical element 53 which is disposed in the path of the beam portion 44*b* and which alters the optical wavelength for that beam portion in such a way that the level of intensity at the secondary output 50 is at a minimum. That ensures that the level of intensity at the complementary main output 49 is at a maximum. A quarter-wave plate 54 is also provided upstream of the polarisation beam divider. Upon linear input polarisation, that quarter-wave plate provides that the level of intensity of the two beam portions 44*a*, and 44*b* is the same so that they can completely destructively interfere at the secondary output 50, whereby the maximum level of intensity is available at the main output. In order also to provide for uniform division of intensity to both beam portions in the case of certain circular polarisation effects, the quarter-wave plate can possibly also be adapted to be rotatable or movable out of the bee path.

The polarisation means according to the invention can also be constructed with purely optical-fiber components, in which case the light in the polarisation means is constantly guided in light waveguides, preferably optical fibers. When using the optical-fiber design configuration, mutual adjustment of the optical elements is desirably eliminated. In the embodiment shown in FIG. 6, there is provided an optical-fiber polarisation beam divider 43′ which divides the laser light supplied by way of the optical fiber 5*a* into two beam portions which are linearly polarised in mutually perpendicular relationship. Those two beam portions are guided in the two polarisation-maintaining fibers 58*a* and 58*b*. The optical fiber 58*b* is turned in such a way that the two beam portions which are initially polarised in mutually perpendicular relationship are then polarised in mutually parallel relationship. The polarisation-maintaining optical fibers 58a and 58b are connected by way of connecting locations (splice locations 57a and 57b) to the optical fibers 59a dnd 59b respectively which lead to the 2×2-directional coupler 48'. The 2×2-directional coupler 48' serves as a recombination device and has a main output going to the optical fiber 26 and a secondary output going to the photoelectric diode 51'. In order to guarantee that the two beam portions constructively interfere in the fiber coupler 48' (interference minimum at the photoelectric diode 51'), the relative optical phase in the two beam portion am must be trimmed to the correct value. That can be done for example by pressing on the fiber 59b. When the photoelectric diode 51' at the secondary output of the directional coupler 48', by way of a regulating device 52' and a piezoelectric crystal 60, regulates the applied pressure and therewith the relative phase difference between the two beam portions, it is possible to provide an actively regulated polarisation means which guarantees defined linear polarisation of the laser light independently of the input polarisation on the output optical fiber 26, in which case the laser light is always of the maximum intensity (regulation to a minimum level of intensity at the photoelectric diode 51').

It will be appreciated that the invention is not limited to the illustrated embodiments. For example it is also possible to use polarisation-selective mirrors or other polarisation-selective components. The structure of the actual interferometer is also not of essential significance to the invention here. For example the interferometer may have a plurality of reference branches which each start from a respective beam divider and which are recombined in their own recombination devices with parts of the measuring beam returning from the measuring section. The important consideration is that there is provided a polarisation means which at the entrance of the actual interferometer establishes a defined, preferably linear polarisation condition of the laser light. Optical fibers other than monomode glass fibers can certainly also be envisaged and are possible for the feed of laser light from the laser light source.

A particular embodiment is shown in FIG. 7 in which the same references identify the same or equivalent components to those appearing in FIG. 1. The essential difference in relation to the FIG. 1 embodiment lies in the use of a polarisation-maintaining feed optical fiber 5' The polarisation means which is generally identified by reference numeral 11 is a simple polariser 65. In this embodiment the for example linear polarisation at the output of the polarisation-maintaining fiber 5' only needs to be approximately fixed, which can be achieved at a low level of adjustment expenditure. The polariser 65 which for example can be a simple linear polariser then fixes the exactly defined polarisation effect upstream of the beam divider 7. The polarisation-maintaining fiber 5' ensures that the light supplied to the polariser 65 does at any event involve a sufficient component in the polarisation direction of the polariser 65 so that the latter does at any event transmit light. For example, it is entirely sufficient if the linear polarisation means at the output of the fiber 5' fixes the value at ±20° with respect to the polarisation direction of the polariser 65 in order downstream of the polariser 65 to still have a large part of the light intensity impinging thereon, with exactly defined polarisation. The optical fiber 5a in the interferometer head may be polarisation-maintaining. However, by rigid connection of a normal monomode fiber to the interferometer head, it is also possible to supply light with a sufficiently accurate polarisation direction to the polariser 65, from the output of the polarisation-maintaining fiber 5'.

Besides the above-described embodiments in which the polarisation means is arranged between the end of the flexible optical fiber which is towards the interferometer, and the beam divider, there is also an alternative option in regard to the arrangement of the polarisation means, which is shown in FIG. 8. More specifically, in accordance with this further variant of the invention, it is provided that the polarisation means 11 is arranged upstream of the end, which is towards the light source, of the flexible optical fiber 5 for the feed of laser light, that a device 66 for detecting the polarisation condition of the laser light is arranged downstream of the flexible optical fiber or fibers and preferably in the vicinity of the beam divider 7, and that the polarisation means 11 which is adjustable in terms of the polarisation condition of the issuing light is regulated by way of the regulating device 68 in dependence on the detected polarisation condition in such a way that laser light of a predetermined, preferably linear polarisation always goes to the entrance of the beam divider 7. An auxiliary beam divider 67 may be disposed upstream of the beam divider 7 of the interferometer head, to branch off a part of the laser light to the polarisation detection device 66. An electric line 69 connects the output of the device 66 to the input of the regulating device 68. The polarisation device 11 which is adapted to be regulated in terms of the polarisation condition of the issuing light comprises advantageous electro-optical and/or mechanically adjustable elements for varying the polarisation condition of the issuing laser light. Such devices for regulating the output polarisation are known to the man skilled in the art, and likewise devices for detecting the polarisation condition, and for that reason such devices are not described in detail here. Because of the more complex structure and the required active regulation however the embodiment just described above will certainly only be used in special cases. However this embodiment can definitely be advantageous in such special cases.

I claim:

1. An interferometer for determining the position or displacement travel of a movable measuring mirror or the like, comprising:

an interferometer head to whose housing or carrier are rigidly connected a beam divider for dividing the laser light into a measuring beam and a reference beam, and a recombination device, wherein the measuring beam which is passed by way of the movable measuring mirror or the like and the reference beam which is passed by way of a fixed reference section interfere in the recombination device, forming at least one optical interference signal, a laser light source arranged outside the interferometer head, least one flexible optical fiber for the laser light feed being arranged between the laser light source and the beam divider of the interferometer head, and a photoelectric detector device for evaluation of the interference signal or signals coming from the recombination device, characterised in that arranged downstream of the flexible optical fiber or fibers (5) for the laser light feed and upstream of the beam divider (7) is a polarisation means (11) which is rigidly connected to the interferometer head housing or carrier (1 or 4) for fixing a defined, optionally linear polarisation of the laser light at the entrance of the beam divider (7).

2. An interferometer as set forth in claim 1 characterised in that disposed at the entrance of the polarisation means is a collimation lens (36, 36') for collimating the light beam issuing from the flexible optical fiber (5) or a fiber (5a) connected thereto.

3. An interferometer as set forth in claim 1 characterised in that disposed in the housing or on the carrier of the interferometer head (1) between the polarisation means (11) and the beam divider (7) which is preferably in the form of a fiber coupler is a light waveguide, preferably a flexible optical fiber (26), into which the optionally linearly polarised laser light at the output of the polarisation means (11) is coupled by way of a coupling-in lens (38, 38').

4. An interferometer as set forth in claim 2 characterised in that the collimation lens (36, 38') and/or the coupling-in lens (38, 38') is a gradient index lens with optionally cylindrical external dimensions.

5. An interferometer as set forth in claim 4 characterised in that the optical fibers (5a, 26) are glued centrally or eccentrically to the gradient index lens (36, 36', 38 or 38' respectively).

6. An interferometer as set forth in claim 1 characterised in that the optical elements (30, 31, 36, 38) of the polarisation means (11) are held adjustably or rigidly in a mechanical holder (35).

7. An interferometer as set forth in claim 6 characterised in that the holder which is for example in the form of a tube (35) has at least one cylindrical bore into which the optical elements (30, 31, 36, 38) are fitted.

8. An interferometer as set forth in claim 1 characterised in that the photoelectric evaluation device (3) is also disposed in per se known manner outside the interferometer head (1 or 4) and receives the optical interference signals by way of flexible output optical fibers (21'a–d).

9. An interferometer as set forth in claim 1 characterised in that at least one optical interference signal from the recombination device (15) is divided into two phase-shifted components and each component is guided by way of a polarisation filter (20a–d), wherein the axes of the two polarisation filters (20a–d) are disposed perpendicularly to each other and at 45 degrees to that linear polarisation direction which is defined by the polarisation means (11) at the entrance of the beam divider (7).

10. An interferometer as set forth in claim 9 characterised in that the polarisation filters (20a–d) are disposed in the interferometer head (1 or 4).

11. An interferometer as set forth in claim 1 characterised in that the polarisation means (11) always transmits light independently of the preferably linear polarisation condition of the laser light at its input and the light at the output of the polarisation means (11) is of a defined, preferably linear polarisation.

12. An interferometer as set forth in claim 11 characterised in that the intensity of the laser light issuing from the polarisation means (11) optionally in linearly polarised form is independent of the polarisation of the laser light at the input of the polarisation means (11), at least when the laser light is linearly polarised at the input of the polarisation means (11).

13. An interferometer as set forth in claim 1 characterised in that the polarisation means (11) comprises a quarter-wave plate (30) and a polariser (31) disposed downstream thereof, the axes of the plate and the polariser being at 45 degrees relative to each other.

14. An interferometer as set forth in claim 1 characterised in that the polarisation means (11)—as viewed in the direction of light transmission—has a collimation lens (36) at the input side, a quarter-wave plate (30), a polariser (31) and a coupling-in lens (38) at the output side for coupling light into a light wave guide (26) leading to the beam divider (7).

15. An interferometer as set forth in claim 1 characterised in that the polarisation means (11) has a device (36') for expanding or dividing the laser light beam coming from the flexible optical fiber (5) or a fiber (5') connected thereto, that the polarisation means (11) comprises two polarisers (40, 41) with mutually perpendicular polarisation directions, through each of which passes a respective beam portion, that disposed downstream of said polarisers (40, 41) there is also at least one polariser (42) which is oriented at 45 degrees relative to said two polarisers (40, 41) and through which the two beam portions pass, and that finally there is provided a device (38') for bringing the two beam portions together after having passed through said polarisers (40, 41, 42).

16. An interferometer as set forth in claim 15 characterised in that the polarisation means (11)—as viewed in the direction of light transmission—comprises:
 a collimation lens (36') at the input side, which collimates the laser light beam,
 two polarisers (40, 41) of mutually perpendicular orientation, which are disposed in closely adjacent juxtaposed relationship and which receive the expanded laser light beam,
 a polariser (42) which is disposed downstream of the two said polarisers (40, 41) and which is oriented at 45 degrees relative thereto, and
 a coupling-in lens (38') on the output side for coupling the expanded laser light beam into a waveguide (26) leading to the beam divider (7).

17. An interferometer as set forth in claim 15 characterised in that the two beam portions are of different intensities upon recombination thereof.

18. An interferometer as set forth in claim 15 characterised in that the expanded laser light beam acts on the two mutually perpendicularly disposed polarisers (40, 41) at surface areas of different sizes.

19. An interferometer as set forth in claim 1 characterised in that the polarisation means has a dividing means (43) for dividing the incoming laser light into two beam portions (44a, b) which are linearly polarised in mutually perpendicular relationship, that there is further provided a polarisation turning means (45) for turning the direction of polarisation of at least one of the two beam portions (44b), and that provided on the output side is a recombination device (48) in which the beam portions (44a, b) which are turned in mutually parallel relationship in terms of their linear polarisation direction by the polarisation turning means are superimposed.

20. An interferometer as set forth in claim 19 characterised in that the dividing means is a polarisation beam divider (43).

21. An interferometer as set forth in claim 19 characterised in that the polarisation turning means is a half-wave plate (45) disposed in one of the two beam portions (44b).

22. An interferometer as set forth in claim 19 characterised in that the recombination device is a beam divider (48) or semi-transparent mirror.

23. An interferometer as set forth in claim 15 or claim 19 characterised in that the polarisation means (11) has a device (53) for adjusting the phase difference between the two beam portions (44a, b) prior to or upon recombination thereof.

24. An interferometer as set forth in claim 23 characterised in that the difference adjusting means, at least in one of the two beam portions, comprises an electro-optical element (53) or a piezoelectric element for varying the geometrical travel length difference for both beam portions.

25. An interferometer as set forth in claim 23 characterised in that there is provided a regulating device (52, 52') for regulating the phase difference of the two beam portions (44a, b) in dependence on the intensity of the linearly polarised laser light at the output of the polarisation means (11).

26. An interferometer as set forth in claim 19 characterised in that disposed upstream of the dividing means (polarisation beam divider 43) is a quarter-wave plate (54) which is preferably rotatable about the light beam direction and/or pivotable out of the beam path.

27. An interferometer as set forth in claim 1 characterised in that the laser light feed optical fiber is a polarisation-maintaining optical fiber (5').

28. An interferometer as set forth in claim 27 characterised in that the polarisation means (11) is formed by a single linear polariser (65).

29. An interferometer for determining the position or displacement travel of a movable measuring mirror or the like, comprising:

an interferometer head to whose housing or carrier are rigidly connected a beam divider for dividing the laser light into a measuring beam and a reference beam, and a recombination device, wherein the measuring beam which is passed byway of the movable measuring mirror or the like and the reference beam which is passed by way of a fixed reference section interfere in the recombination device, forming at least one optical interference signal, a laser light source arranged outside the interferometer head, at least one flexible optical fiber for the laser light feed being arranged between the laser light source and the beam divider of the interferometer head, and a photoelectric detector device for evaluation of the interference signal or signals coming form the recombination device, characterised in that a polarisation means is arranged in per se known manner upstream of the end, which is towards the light source, of the flexible optical fiber or fibers for the laser light feed, that a device for detecting the polarisation condition of the laser light is arranged downstream of the flexible optical fiber or fibers, preferably in the vicinity of the beam divider, and that the polarisation means which is adapted to be regulated in terms of the polarisation condition of the issuing light is regulated in dependence on the detected polarisation condition in such a way that laser light of a predetermined preferably linear polarisation constantly goes to the entrance of the beam divider.

30. An interferometer as set forth in claim 29 characterised in that disposed upstream of the beam divider is an auxiliary beam divider which branches off a part of the laser light to the polarisation detection device.

31. An interferometer as set forth in claim 29 characterised in that the polarisation device has electro-optical elements and/or mechanically adjustable elements for varying the polarisation condition of the issuing light.

32. An interferometer as set forth in claim 1 or claim 19 or claim 20 characterised in that the laser light in the polarisation means is constantly guided in light waveguides (in 43'; 58a, b; 59a, b; in 48'), preferably optical fibers.

33. An interferometer as set forth in claim 19 or claim 29 characterised in that the two beam portions downstream of the dividing means (43') are guided in a respective polarisation-maintaining optical fiber (58a, 58b), wherein said optical fibers (58a, 58b) are so turned relative to each other that the originally mutually perpendicularly polarised beam portions are polarised in mutually parallel relationship upon recombination thereof in the recombination device (48').

34. An interferometer as set forth in claim 33 characterised in that a mechanical pressure is applied, for example by way of a piezoelectric element (60), to at least one of the optical fibers (59b) in which the beam portions are carried for adjusting the relative phase difference between the two beam portions.

* * * * *

UNITED STATES PATENT AND TRADEMARK OFFICE
CERTIFICATE OF CORRECTION

PATENT NO. : 5,359,415
DATED : October 25, 1994
INVENTOR(S) : Werner Tabarelli

It is certified that error appears in the above—identified patent and that said Letters Patent is hereby corrected as shown below:

Column 6, Line 42; "bean" should read "beam"

Line 54; "bean" should read "beam"

Column 10; Line 51; "bee" should read "beam"

Column 11; Line 11; "am" should read "arms"

igned and Sealed this

Thirtieth Day of May, 1995

Attest:

BRUCE LEHMAN

Attesting Officer     Commissioner of Patents and Trademarks